Oct. 25, 1966 D. J. HARDING 3,281,538

TIME DIVISION MULTIPLEX COMMUNICATION SYSTEMS

Filed Jan. 14, 1963 2 Sheets-Sheet 1

INVENTOR
DOUGLAS J. HARDING

BY Hall & Houghton

ATTORNEY

INVENTOR
DOUGLAS J. HARDING
BY Hall & Houghton
ATTORNEY

United States Patent Office 3,281,538

Patented Oct. 25, 1966

3,281,538

TIME DIVISION MULTIPLEX COMMUNICATION SYSTEMS

Douglas John Harding, Radlett, England, assignor to Her Majesty's Postmaster General, London, England Filed Jan. 14, 1963, Ser. No. 251,150
Claims priority, application Great Britain, Jan. 16, 1962, 1,611/62
8 Claims. (Cl. 179—15)

This invention relates to time division multiplex communication systems and has particular reference to an analogue system for transmitting speech signals.

In known analogue time division multiplex communication systems for speech signals, supervisory signals have been conveyed along the multiplex highways of the system by V.F. signals transmitted as modulated pulses occupying the speech channels or as V.F. signals transmitted along separate signalling paths. Additionally, it has been proposed to use the presence and absence of pulses on the speech channels to indicate a limited number of supervisory functions, e.g. "answer" and "clear."

It is well known that in order to obtain acceptable crosstalk attenuation between adjacent speech channels connected to the same highway, it is necessary to leave a gap between those speech channels. Consequently, there are periods during which the highway is not used.

According to the present invention, some at least of the gaps between adjacent speech channels of a highway of a time division multiplex analogue communication system are utilised for the carrying of supervisory signals.

The gap between two adjacent speech channels may accommodate one or more different supervisory signals, each one thus constituting an additional channel on the highway. A speech channel and its immediately adjacent supervisory signal channel or channels can be grouped together to constitute a single time slot in the system and can be gated through a requisite signalling path in the system by the use of one gating pulse. The time slot is split into the speech and and supervisory signal channels by clock pulses which may be the same for all time slots and of which one clock pulse is coincident with the speech channel and the other or others is or are coincident with the supervisory signal or signals Normally, the duration of each pulse on a speech channel is greater than that of the pulses used on the supervisory signal channels. The signals on the supervisory channels are gated signals in binary form.

The number of supervisory signals which can be sent over the same highway can be increased by further time division of slow speed functions, i.e., by transmitting supervisory signals representing those functions at the lower time divided rate.

By way of example only, embodiments of the invention will now be described in greater detail with reference to the accompanying drawings of which:

Figure 1:
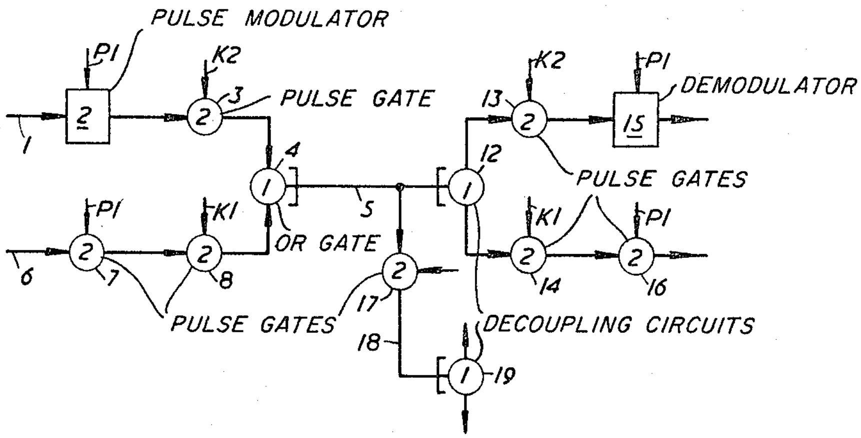
FIG. 1 is a block schematic of part of a first embodiment.

In the embodiment of FIG. 1, speech on input lead 1 amplitude modulates the pulses of a pulse train P1 in modulator 2, the resultant speech modulated pulses being of a duration equal to that of the pulses of pulse train P1. It now becomes necessary to reduce the duration of the speech modulated pulses to provide separation between adjacent speech channels to ensure acceptable crosstalk attenuation as is explained above. The speech-modulated pulses are therefore gated through AND-gate 3 and reduced in duration by clock pulses K2 and the reduced duration pulses transmitted via OR-gate 4 to a time division multiplex highway 5.

In like manner, a supervisory signal in binary coded form on input lead 6 is gated by the pulses of pulse train P1 through AND-gate 7 and then through AND-gate 8 by clock pulses K1, the reduced duration pulses being transmitted via OR-gate 4 to the highway 5.

The highway 5 may, for example, be divided into 30 time slots which are sub-divided as indicated above by clock pulse trains K1 and K2 of which K1 occupies part of the initial portion of each time slot and K2 the terminal portion, the portions being spaced in a manner referred to in more detail later.

Figure 2:
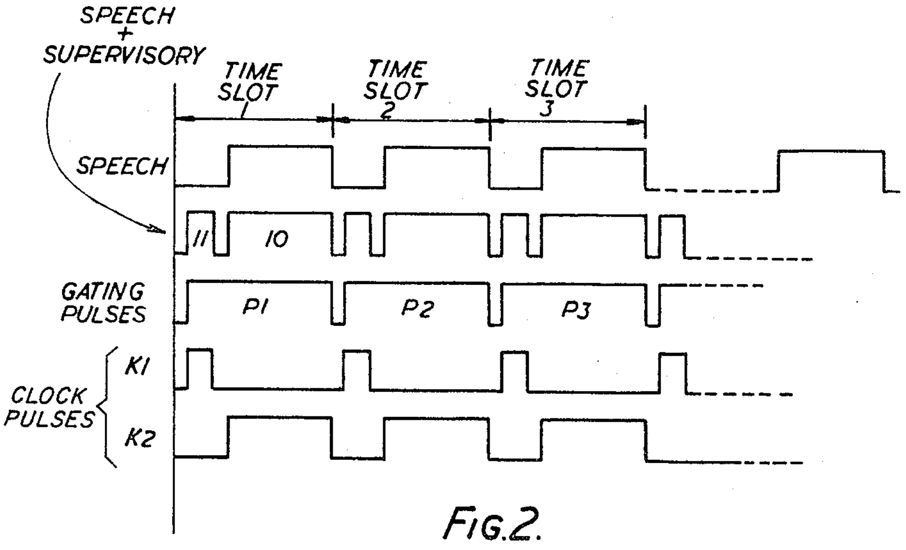
FIG. 2 shows the waveforms of pulse trains used in the embodiment of FIG. 1.

The relationship of the pulses P1, K1 and K2 is shown in FIG. 2, and it will be seen that the speech-modulated pulses 10 occupy a position in the time slot represented by pulse P1 determined by the clock pulses K2 and similarly the position of the signal pulse train 11 is determined by the clock pulses K1.

In the time slots the spaces not occupied by speech signals may thus contain supervisory signals. FIG. 2 shows ideally the relationship between pulses in diagrammatic form only, but in the example quoted above for 30 time slots, typical figures are, time slots of 3.3 microseconds duration, speech pulses 2.0 microseconds duration, supervisory signal pulses 0.5 microseconds duration and spaced from adjacent speech pulses by gaps of 0.4 microsecond duration.

At the receiving end of the highway 5 is a decoupling circuit 12 through which both the speech and supervisory pulses pass, the speech pulses being gated through AND-gate 13 and the supervisory pulses being gated through AND-gate 14 by clock pulses K2 and K1 respectively. The outputs of gates 13 and 14 are connected respectively to demodulator 15 and AND-gate 16 to both of which pulse train P1 is applied.

In each time slot the available time is located between speech and signal functions, due regard being taken of the effect of crosstalk from speech to signal and from signal to speech. It will be appreciated that in a time slot the supervisory signals may either precede or follow the speech signals, or both precede and follow.

In FIG. 1, highway 5 is also shown connected via AND-gate 17 to a second time division multiplex highway 18 terminating in a decoupling circuit 19 which corresponds with the decoupling circuit 12. When it is desired to transmit one or more of the channels on highway 5 to highway 18, gate 17 is pulsed with pulses of one or more of the pulse trains appropriate to the channels. The pulses of those pulse trains thus gate both speech signal and adjacent supervisory signal or signals occupying the same time slots and no additional switching is required for the supervisory signal channels. A practical system embodying the present invention will normally include a number of further time division multiplex communication highways each interconnected with some at least of the others and to highway 5 by means of pulse gates equivalent in function to gate 17.

Under ideal conditions with pulses having instant rise and decay times and the transmission equipment having no memory, the signal and speech pulses could be spaced in the time slot so that no interference took place. Under practical conditions, however, allowance must be made for the rise and decay times of the pulses and for the memory effect of the transmission equipment and it will be appreciated that the pulses must be so spaced that any interference that occurs is at an acceptable level. If a signal pulse precedes the speech pulse in a time slot, then the interference is between the signal and speech of the same channel, but if the signal follows the speech in the time slot, then the interference is between the signal of one channel and the speech of the next channel. A discharge pulse can, if necessary, be provided between the pulses of adjacent time slots and between the pulses in the same time slot. It will normally be the case that the supervisory signal precedes the speech signal in the time slot because most supervisory signals are sent at a time when no speech signals are present. Examples of supervisory signals sent in the absence of speech signals are "dial tone," "ring tone," "number unobtainable tone." Timing signals are an example of supervisory signals sent whilst speech signals may be present but these are intended to be heard by the subscribers. Cross talk between a supervisory signal and the adjacent speech signals can be reduced by transmitting the supervisory signal pulses at a very low amplitude level. A low amplitude level can be used because the supervisory signals are in binary coded form. A further advantage of having a signal pulse, preceding the speech pulse in a time slot is that the signal pulse can be gated and delayed, so as to be available at any time during the remainder of the time slot.

The number of supervisory signals sent over the same highway can be increased by further time division of the slow speed functions.

Figure 3:
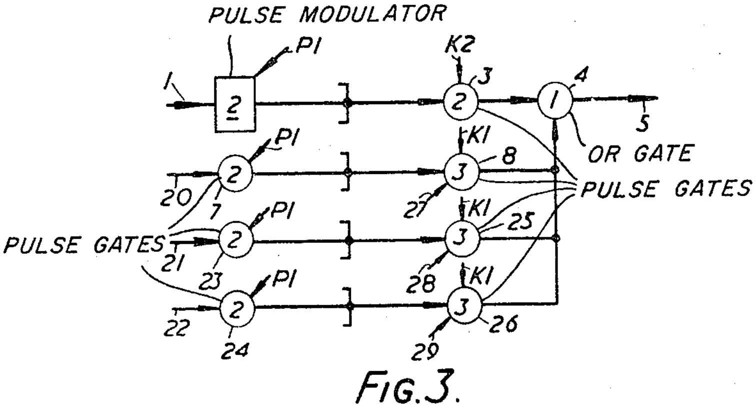
FIG. 3 is a block schematic of part of a second embodiment.

FIG. 3 shows in schematic form an example of the method mentioned in the preceding paragraph.

Speech signals on input lead 1 amplitude modulate the pulses of pulse train P1 in a modulator 2, the modulated pulses being gated and reduced in duration through AND-gate 3 by clock pulses K2 as before.

A first signal channel 20 carries a first supervisory signal which, when present, is applied to AND-gate 7 to which pulse train P1 is applied and is then gated through AND-gate 8 and reduced in duration by pulse train 27 and clock pulses K1. Similarly, second and third signals are carried by signal channels 21 and 22 respectively, which, when present, are applied to AND-gates 23 and 24 respectively to which pulse train P1 is applied, and are the gated respectively through AND-gates 25 and 26 by pulse trains 28 and 29 respectively and clock pulses K1.

The gates 8, 25 and 26 are each common to a number, for example 30 in the embodiment quoted above, of channels. The pulses 27, 28 and 29 are each of a duration equal to the total duration of the time slots of those channels and are spaced as shown.

Figure 4:
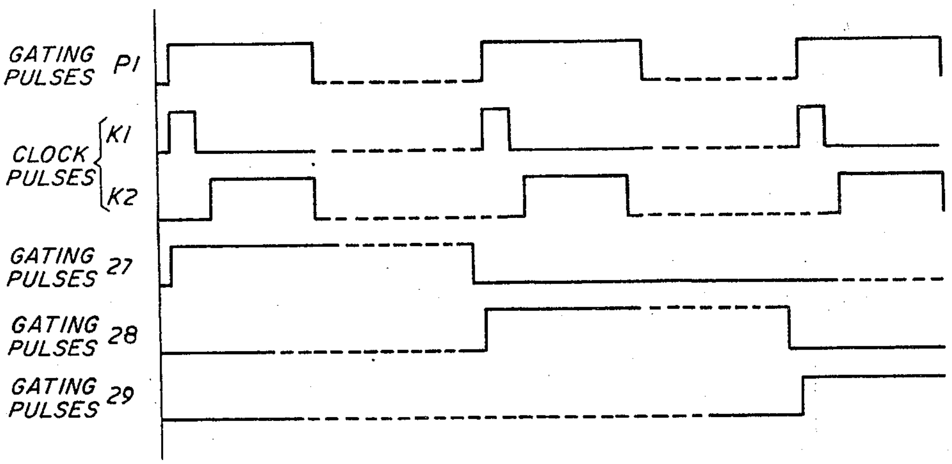
FIG. 4 shows the waveforms of pulse trains used in the embodiment of FIG. 3.

The relative positions of the pulses of the pulse trains used in the embodiment of FIG. 3 are shown in FIG. 4.

Since the supervisory and speech signals occupy the same time slot, and are gated in common along a required communication path, testing of that path after it has been set up and before speech communication takes place is automatically effected if satisfactory transmission takes place of the supervisory signals which precede speech communication because the supervisory signals are transmitted over the highway or highways in the time slot and along the same path as that ultimately to be used for the speech signals.

I claim:

1. An analogue time division multiplex communication system comprising in combination input circuits, a time division multiplex highway and, for each input circuit a pulse modulator to which the input circuit is connected, a pulse gating circuit connecting the pulse modulator to the highway for effecting a reduction in duration of each pulse transmitted from the modulator thereby gating to the highway part only of each said pulse from said modulator, and means for transmitting to the highway in binary coded form at least one further signal occupying part of the non-gated portion of said pulse.

2. An analogue time division multiplex communication system as claimed in claim 1 and further comprising means for time dividing the non-gated portions of each said pulse into a plurality of time positions in a recurring cycle of time positions and a circuit for allocating a different time positions to each binary coded signal.

3. An analogue time division multiplex communication system as claimed in claim 1 and further comprising for each different binary coded signal, a pulse gating circuit connected to the highway for gating the supervisory pulse signal to the highway at a time characterising the binary coded signal.

4. An analogue time division multiplex communication system comprising in combination input circuits, a time division multiplex highway and, for each input circuit a pulse modulator to which the input circuit is connected, a pulse gating circuit connecting the pulse modulator to the highway for effecting a reduction in duration of each pulse transmitted from the modulator thereby gating to the highway part only of each said pulse from said modulator, and a further gating circuit for gating to said highway at least one binary coded signal occupying part of the non-gated portion of said pulse.

5. An analogue time division multiplex communication system comprising in combination input circuits, a time division multiplex highway having a plurality of time slots and, for each input circuit, a pulse modulator to which the input circuit is connected, a pulse gating circuit connecting the pulse modulator to the highway for effecting a reduction in duration of each pulse transmitted from the modulator thereby gating to the highway part only of each said pulse from said modulator, means for transmitting to the highway at least one binary coded signal occupying part of the non-grated portion of said pulse, a plurality of output circuits, a pulse gating circuit for each output circuit interconnecting the latter and the highway, binary coded signal output circuits and means interconnecting the highway and the binary coded signal output circuits for transmitting said binary coded signals to a selected binary coded signal output circuit.

6. A system as claimed in claim 5 in which the parts allocated for the transmission of the binary coded signals occupy corresponding portions of the time slots.

7. A system as claimed in claim 6 which includes a source of clock pulses for each part of the time slots one of which sources provides clock pulses of a duration and time position corresponding with the part of each time slot allocated for the transmission of information and each other of which sources provides clock pulses of a duration and time position corresponding with one part of each time slot allocated for the transmission of binary coded information and gating means operated by one or other of the sources of clock pulses for connecting to the highway at the time positions of the sources the information input circuits.

8. A system as claimed in claim 5 and comprising a plurality of time division multiplex communication highways each comprising a plurality of time slots and each interconnected with some at least of the other highways by means of pulse gates, synchronous time slots on interconnected highways being placed in communication by pulsing the gate interconnecting the highways by a train of pulses coincident with the synchronous time slots comprising pulses of a duration equal to that of the time slot.

References Cited by the Examiner

UNITED STATES PATENTS

| | | | |
|---|---|---|---|
| 3,118,019 | 1/1964 | Feder et al. | 179—15 |
| 3,207,851 | 9/1965 | Fukinuki | 179—15 |

DAVID G. REDINBAUGH, *Primary Examiner.*

R. L. GRIFFIN, *Assistant Examiner.*